March 3, 1936.  T. F. McCARTHY  2,032,428
SHAKER CONVEYER TROUGH
Filed April 18, 1934  2 Sheets-Sheet 1
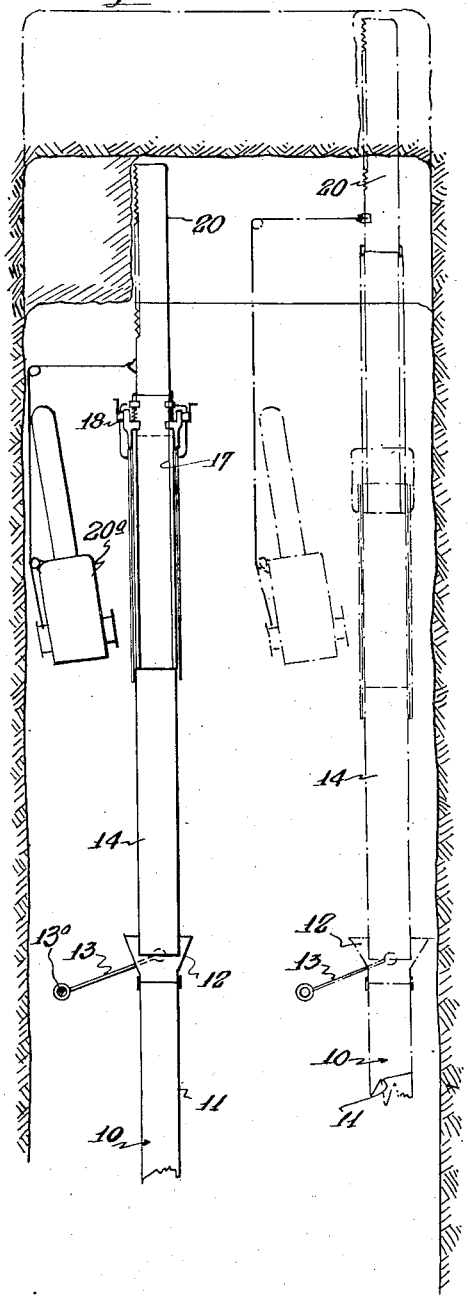
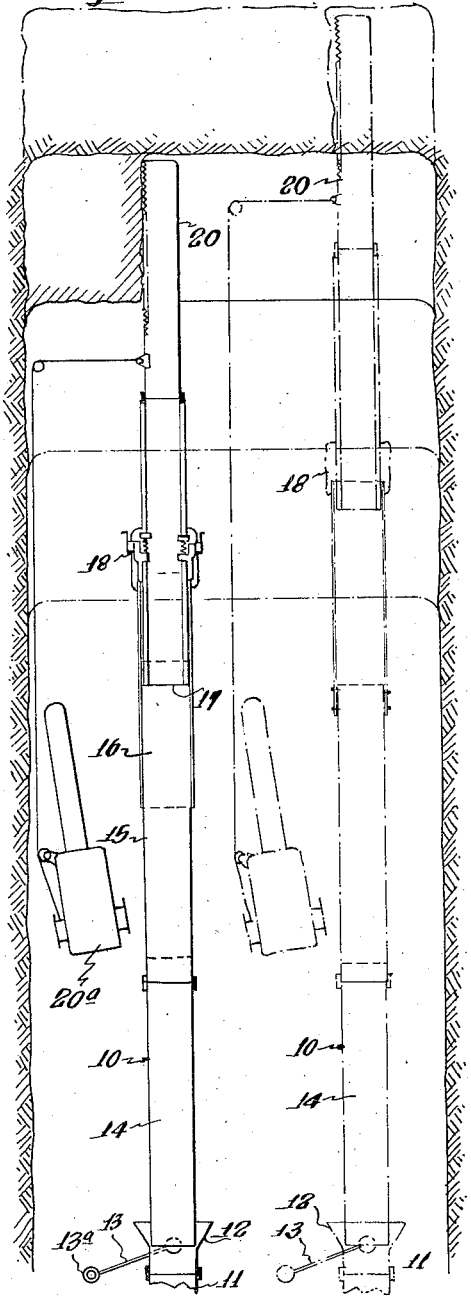
Inventor
Timothy F. McCarthy
Clarence F. Poole
Attorney March 3, 1936. T. F. McCARTHY 2,032,428
SHAKER CONVEYER TROUGH
Filed April 18, 1934 2 Sheets-Sheet 2
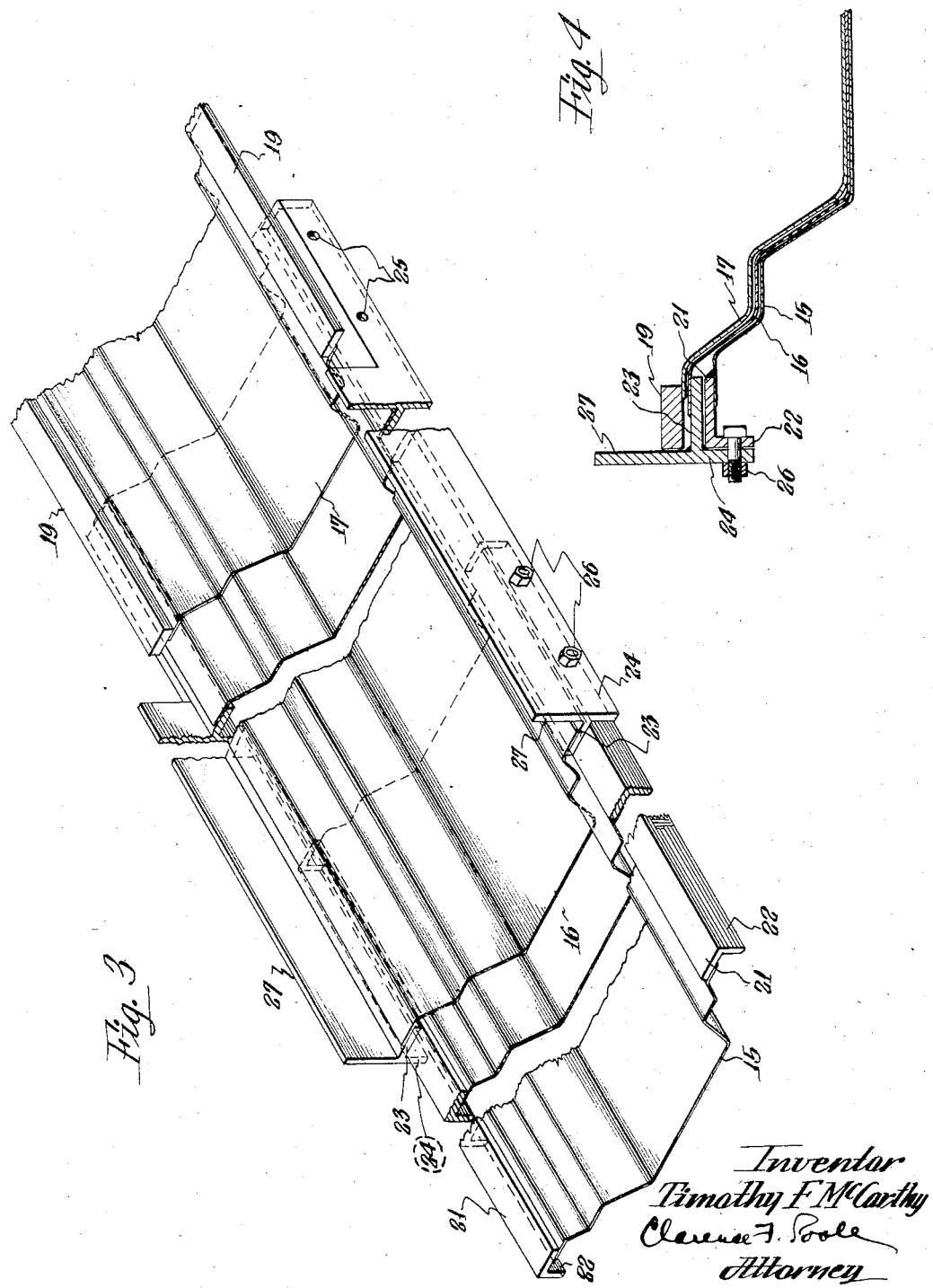

Patented Mar. 3, 1936

2,032,428

UNITED STATES PATENT OFFICE 2,032,428

SHAKER CONVEYER TROUGH

Timothy F. McCarthy, Indiana, Pa.

Application April 18, 1934, Serial No. 721,111

9 Claims. (Cl. 198—220)

This invention relates to improvements in shaker conveyer troughs and more particularly to an extensible trough connection for a shaker conveyer pan line.

In loading coal in mines with a shaker conveyer, particularly one having an automatically extensible loading device on the forward end of the pan line, it is desirous that the pan line be capable of extension without uncoupling the pans or troughs or inserting additional troughs in the pan line at the working face, which operations make necessary the carrying of troughs from the entry to the face of the coal for coupling in the pan line. It is also necessary that the troughs be held from lateral displacement with respect to each other while the loading device is being fed across the face of the coal and that extension or retraction of the troughs be accomplished in a simplified manner. The device of my invention is so arranged that the trough sections in the pan line may be held in guided relationship with respect to each other and be extended as the working face is advanced in a novel, efficient and simple manner.

One of the objects of my invention is to provide a novel and improved means for guiding the trough sections of a shaker conveyer pan line for extension without uncoupling the pan line. Another object is to provide an extending and guiding means so arranged that the sections in the pan line may be independently extended or retracted with respect to each other and held in fixed relation with respect to each other when desired. Still another object of my invention is to so arrange the holding and guiding means that the troughs may be held from lateral displacement with respect to each other in such a manner that the holding means for two trough sections will not interfere with the extension of a third trough section with respect to these trough sections.

My invention may be more clearly understood with reference to the accompanying drawings wherein:

Figure 1 is a top plan view of a conveyer pan line embodying the device of my invention;

Figure 2 is a top plan view of a conveyer pan line embodying the device of my invention, showing the pan line in further extended positions than in Figure 1;

Figure 3 is an enlarged detail isometric view of the apparatus embodying my invention with certain parts broken away and shown in section; and Figure 4 is an enlarged fragmentary transverse vertical sectional view of the embodiment of my invention shown in Figure 3.

With reference now in particular to the drawings illustrating one embodiment of my invention, a shaker conveyer pan line 10 is provided. The pan line 10 is reciprocably driven by suitable drive mechanism in the usual manner (not shown) for conveying material therealong. As herein shown, the pan line 10 includes a trough section 11 having a swivel 12 on the forward end thereof. The swivel 12 is held from lateral movement by means of a connecting bar 13, commonly referred to as a pendulum. The pendulum 13 is pivotally connected to the swivel 12 in the usual manner and has pivotal connection with a jack 13a which may be interposed between the mine roof and mine bottom in such a manner that said pendulum may hold the trough section 11 and said swivel from lateral movement with respect to the ground, but permit the usual reciprocable action of said pan line.

A trough section 14 is connected to the swivel 12 for pivotal movement with respect to the trough section 11 about a vertical axis. A trough section 15 is secured to the forward end of the trough section 14 in the usual manner and is adapted to have a trough section 16 nested therein for extension or retraction with respect thereto. Said last-mentioned trough section likewise is adapted to have a trough section 17 nested therein for extension or retraction with respect thereto. As herein shown, an automatic feeding device 18 of a usual constructon is secured to the forward end of the trough section 16 and is adapted to engage bearing plates 19, 19 extending laterally outwardly from the outer upper ends of the trough section 17 for extending or retracting said trough section with respect thereto by suitable manually controlled friction means in the usual manner. Said feeding device is not herein shown in detail since it is no portion of my present invention and is only included for the purpose of more clearly illustrating my present invention. A loading device 20 is herein shown as being secured to the forward end of the trough section 17 and may be of any type, but in the present disclosure is shown as being a loading pan similar to that described in a prior application, Serial No. 667,583, filed by me on April 24, 1933, which issued as Patent No. 2,030,145 on February 11, 1936. The loading pan 20 may be fed into the material by means of the feeding device 18 and along the face of the coal by suitable winding means, such as the winding drum of a mining machine indicated at 20a.

With reference now in particular to Figures 3 and 4 of the drawings and several of the novel features of my invention, the guiding and holding means for the trough sections 15 and 16 include a pair of laterally extending bearing members 21, 21 secured to the upper ends of the trough section 15 and extending laterally therefrom in opposite directions. The bearing members 21, 21 are provided with depending outer portions or flanges 22, 22, herein shown as being formed integral therewith so that each of said bearing members with its depending flange forms a right angle.

The trough section 16 is provided with bearing members 23, 23 secured to the under side of the upper ends thereof and extending laterally therefrom in opposite directions. The bearing members 23, 23 are adapted to rest on and have bearing engagement with the upper surfaces of the bearing members 21, 21. The bearing members 23, 23 are provided with depending outer portions or flanges 24, 24 adapted to have bearing and guiding engagement with the outside of the depending flanges 22, 22 of the bearing members 21, 21 to form a means for guiding the trough section 16 with respect to the trough section 15 when extended therefrom and to prevent lateral displacement of said trough sections with respect to each other when the loading pan 20 is fed across the face of the coal during the loading operation.

The holding means herein shown includes a plurality of spaced apertures 25, 25 provided in the depending flanges 22 and 24 of the bearing members 21 and 23, respectively. These apertures are adapted to register with each other and suitable means are provided which are adapted to register for engagement with these apertures, which may be pins or any other registering means, but which are herein preferably shown as being bolts 26, 26 having nuts threaded thereon. It is evident that, if desired, other holding means, such as suitable clamping means of an ordinary construction may be substituted for said apertures and bolts. Thus, the trough sections 15 and 16 may be held in fixed relationship with respect to each other in a simple and effective manner, and the guiding means for these trough sections forms a means to permit said trough sections to be held in fixed relationship with respect to each other and is so arranged as to relieve the holding means of twisting strains. It will be seen from the foregoing that the arrangement is such that the holding means does not hinder extension or retraction of the trough section 17 with respect to the trough sections 15 and 16.

With reference now in particular to the means for guiding the trough section 17 for extension from or retraction within the trough sections 15 and 16, upstanding guide members 27, 27 extend upwardly from the bearing members 23, 23 and as herein shown are formed integral with and in alignment with the depending flanges 24, 24. The insides of the guide members 27, 27 are adapted to be engaged by the outer sides of the bearing plates 19, 19 of the trough 17 and form a guide means for said trough to hold said trough from lateral displacement with respect to the troughs 15 and 16 during the loading operation. The trough section 17 may be extended from or retracted within the trough sections 15 and 16 by means of the feeder head 18, hereinbefore mentioned and may be held in fixed relation with respect to said trough sections by means of said feeder head.

It should be understood that where it is not desired to use the feeder head 18, the bearing plates 19, 19 may be provided with upwardly extending outer portions or flanges, which may abut the insides of the guide members 27, 27. The troughs 16 and 17 may thus be held in fixed relation with respect to each other by suitable clamps or a pin and aperture arrangement as previously described.

With further reference to Figures 1 and 2, illustrating the manner in which the trough sections may be extended with respect to each other; in Figure 1 the trough sections 15, 16 and 17 are shown by solid lines as being telescoped with respect to each other. The first cut may thus be loaded by feeding the loading pan 20 across the mine face in a manner similar to that described in my aforementioned prior application. The broken lines in Figure 1 illustrate the arrangement for loading out the second cut and show the trough section 17 extended from the trough section 16 by means of the feeding device 18. Figure 2 shows the adjustment for loading out a third cut from the initial cut shown in Figure 1, and shows the trough section 16 partially extended from the trough section 15 and the trough section 17 partially extended from the trough section 16. The trough sections 15 and 16 are usually manually extended with respect to each other and held in fixed relation with respect to each other by means of the bolts 26, 26 registering with the desired apertures 25, 25. The broken lines in Figure 2 illustrate the arrangement wherein all of the trough sections are extended with respect to each other for loading out a fourth cut without movement of the swivel 12 or the insertion of additional troughs in the pan line.

It will thus be seen that a new and improved guiding and holding means has been provided for the shaker conveyer pan line 10, which permits the telescoping of a number of troughs within each other and permits said troughs to be extended or retracted with respect to each other and be held in fixed relation with respect to each other during reciprocation of the pan line. It will also be seen that the device of my invention is so arranged that the holding means also forms a guiding means to hold the trough sections in alignment with respect to each other and prevent lateral displacement of said trough sections during feeding across the coal face and that the means for securing one set of trough sections in fixed relationship with respect to the other does not interfere with sliding movement of the third trough section with respect to these trough sections.

While I have herein shown and described one form in which my invention may be embodied, it will be understood that the construction or arrangement of the various parts may be altered or changed without departing from the spirit and scope thereof. Furthermore, I do not wish to be construed as limiting myself to the particular form shown, excepting as it may be limited in the appended claims.

I claim as my invention:

1. An extensible pan line for a shaker conveyer comprising a reciprocably movable trough section having bearing members extending laterally from the upper sides thereof and forming a slidable support for another trough section, said bearing members being provided with depending outer portions extending downwardly at right angles to the upper sides thereof, another trough section adapted to be nested within or extended from said first-mentioned trough section, bearing members extending laterally from the sides thereof adapted to have slidable bearing engagement with said first-mentioned bearing members, said last-mentioned bearing members being provided with depending outer portions adapted to abut the outside of the depending portions of said first-mentioned bearing members to form a guiding means for said second-mentioned trough section and guide said trough against lateral displacement and form a means whereby said trough sections may be secured together.

2. An extensible pan line for a shaker conveyer comprising a reciprocably movable trough section having bearing members extending laterally from the upper sides thereof, said bearing members being provided with depending outer portions, another trough section adapted to be nested within said first-mentioned trough section having bearing members extending laterally from the sides thereof adapted to have bearing engagement with said first-mentioned bearing members, said last-mentioned bearing members being provided with depending outer portions adapted to engage the outside of the depending portions of said first-mentioned bearing members to form a guiding means for said second-mentioned trough section, and being provided with upwardly extending outer portions to form a guide means for a third trough section.

3. An extensible pan line in accordance with claim 1 wherein the depending portions of the first and second-mentioned bearing members are provided with suitable apertures adapted to register with each other, and wherein means are provided which are adapted to register for engagement with said apertures for holding said trough sections in fixed relation with respect to each other.

4. An extensible pan line in accordance with claim 2 wherein the depending portions of the first and second-mentioned bearing members are provided with suitable apertures adapted to register with each other, and wherein means are provided which are adapted to register for engagement with said apertures for holding said trough sections in fixed relation with respect to each other.

5. In a shaker conveyer pan line, a reciprocably movable trough section, another trough section adapted to be nested therein, a third trough section adapted to be nested within said second-mentioned trough section, and means for guiding said trough sections for extension with respect to each other comprising horizontal bearing members extending laterally from opposite sides of said first-mentioned trough section and provided with depending outer portions, horizontal bearing members extending laterally from opposite sides of said second-mentioned trough section and adapted to have bearing engagement with said first-mentioned bearing members, said last-mentioned bearing members being provided with depending outer portions adapted to engage the outer sides of said first-mentioned bearing member and upwardly extending outer portions adapted to form a guide for said third trough section.

6. In a shaker conveyer pan line, a reciprocably movable trough section, another trough section adapted to be nested therein, and means for guiding said trough sections for extension or retraction with respect to each other and holding said trough sections in fixed relation with respect to each other comprising horizontal bearing members extending laterally from opposite sides of said first-mentioned trough section, said bearing members being provided with depending outer portions, horizontal bearing members extending laterally from opposite sides of said second-mentioned trough section and adapted to have bearing engagement with said first-mentioned bearing members, said last-mentioned bearing members being provided with depending outer portions adapted to engage the outer sides of said portions depending from said first-mentioned bearing members, said depending portions of both of said bearing members being provided with suitable apertures adapted to register with each other and means adapted to register for engagement with said apertures for holding said trough sections in fixed relation with respect to each other.

7. In a shaker conveyor pan line, a reciprocably movable trough section, another trough section adapted to be nested therein, a third trough section adapted to be nested within said second-mentioned trough section, and means for guiding said trough sections for extension with respect to each other comprising horizontal bearing members extending laterally from opposite sides of said first-mentioned trough section and provided with depending outer portions, horizontal bearing members extending laterally from opposite sides of said second-mentioned trough section and adapted to have bearing engagement with said first-mentioned bearing members, said last-mentioned bearing members being provided with depending outer portions adapted to engage the outer sides of said portions depending from said first-mentioned bearing members and upwardly extending outer portions adapted to form a guide for said third-trough section, and means for holding said first and second-mentioned trough sections in fixed relationship with respect to each other and permitting said third trough section to be extended or retracted with respect thereto comprising means whereby the depending portions of said bearing members may be held in fixed relation with respect to each other.

8. In a shaker conveyer pan line, a reciprocably movable trough section, another trough section adapted to be nested therein, a third trough section adapted to be nested within said second-mentioned trough section, and means for guiding said trough sections for extension with respect to each other comprising horizontal bearing members extending laterally from opposite sides of said first-mentioned trough section and provided with depending outer portions, horizontal bearing members extending laterally from opposite sides of said second-mentioned trough section and adapted to have bearing engagement with said first-mentioned bearing members, said last-mentioned bearing members being provided with depending outer portions adapted to engage the outer sides of said depending outer portions of said first-mentioned bearing members and upwardly extending outer portions to form a guide for said third-trough section, and means for holding said first and second-mentioned trough sections in fixed relationship with respect to each other and permitting said third trough section to be extended or retracted with respect thereto comprising apertures in the depending portions of said first and second-mentioned bearing members and means adapted to register for engagement with said apertures.

9. In a shaker conveyer pan line, a reciprocably movable trough section, another trough section adapted to be nested therein and reciprocated thereby, a third trough section adapted to be nested within said second-mentioned trough section, means for automatically extending said third trough section with respect to said first and second-named trough sections comprising a feeding device secured to the forward end of said second-named trough section, and means for guiding all of said trough sections for extension with respect to each other, operable to selectively hold said first-named trough sections in fixed relationship with respect to each other comprising horizontal bearing members extending laterally from opposite sides of said first-mentioned trough section and provided with depending outer portions, horizontal bearing members extending laterally from opposite sides of said second-mentioned trough section and adapted to have bearing engagement with said first-mentioned bearing members, said last-mentioned bearing members being provided with depending outer portions adapted to engage the outer sides of said portions depending from said first-mentioned bearing members and upwardly extending outer portions adapted to form a guide for said third trough section, and means for holding said first and second-mentioned trough sections in fixed relationship with respect to each other and permitting said third-trough section to be extended or retracted with respect thereto comprising means whereby the depending portions of said bearing members may be held in fixed relation with respect to each other.

TIMOTHY F. McCARTHY.